(12) United States Patent
Potts

(10) Patent No.: US 12,129,195 B2
(45) Date of Patent: Oct. 29, 2024

(54) LAYERED CAPILLARY WETTING

(71) Applicant: Geomatrix LLC, Reston, VA (US)

(72) Inventor: David A. Potts, Lyme, CT (US)

(73) Assignee: GEOMATRIX LLC, Old Saybrook, CT (US)

(*) Notice: Subject to any disclaimer, the term of this patent is extended or adjusted under 35 U.S.C. 154(b) by 15 days.

(21) Appl. No.: 17/746,741

(22) Filed: May 17, 2022

(65) Prior Publication Data

US 2022/0402792 A1    Dec. 22, 2022

Related U.S. Application Data

(60) Provisional application No. 63/213,563, filed on Jun. 22, 2021.

(51) Int. Cl.
*C02F 3/30* (2023.01)
*C02F 1/00* (2023.01)
*C02F 101/16* (2006.01)

(52) U.S. Cl.
CPC .............. *C02F 3/305* (2013.01); *C02F 1/004* (2013.01); *C02F 2101/16* (2013.01); *C02F 2305/06* (2013.01)

(58) Field of Classification Search
CPC ...... C02F 3/305; C02F 1/004; C02F 2101/16; C02F 2305/06; C02F 3/306; C02F 3/046; C02F 2103/001; C02F 2301/08
USPC .......................................................... 210/610
See application file for complete search history.

(56) References Cited

U.S. PATENT DOCUMENTS

| | | | | |
|---|---|---|---|---|
| 5,954,963 A | * | 9/1999 | Matheson | C02F 3/342 |
| | | | | 210/903 |
| 7,288,190 B2 | * | 10/2007 | Presby | C02F 3/302 |
| | | | | 405/36 |
| 2019/0210901 A1 | * | 7/2019 | Komocki | C02F 3/348 |

FOREIGN PATENT DOCUMENTS

| | | | | | |
|---|---|---|---|---|---|
| CN | 102020399 A | * | 4/2011 | | C02F 3/30 |
| CN | 20271763-1 U | * | 2/2013 | | C02F 3/32 |
| CN | 205313216 U | | 6/2016 | | |
| CN | 106495388 A | * | 3/2017 | | C02F 9/14 |
| CN | 107434326 A | | 12/2017 | | |
| CN | 207108725 U | | 3/2018 | | |
| CN | 207391102 U | | 5/2018 | | |
| CN | 109437393 A | * | 3/2019 | | C02F 3/02 |
| JP | H11347313 A | | 12/1999 | | |
| KR | 20000065590 A | * | 11/2000 | | C02F 3/28 |

(Continued)

OTHER PUBLICATIONS

Translation of Hao (CN 102020399A) (Year: 2011).*

(Continued)

*Primary Examiner* — Ekandra S. Miller-Cruz
(74) *Attorney, Agent, or Firm* — GRASSO PLLC

(57) ABSTRACT

Relatively greater capillarity material layers and relatively lesser capillarity material layers are provided. These layers can be used to promote capillary wetting in capillary wetting zones to promote prolonged periods of water retention. Carbon sources present in the capillary wetting zones may exhibit prolonged use provided by limited drying and wetting cycles experienced in the capillary wetting zones. Carbon sources positioned between saturated layers may exhibit prolonged use provided by anoxic conditions created by upper and lower water seals of the saturated layers. Capillarity layers can be employed in infiltration systems handling water, such as residential wastewater.

19 Claims, 5 Drawing Sheets

(56) References Cited

FOREIGN PATENT DOCUMENTS

| SU | 618122 | A1 | 8/1978 |
|---|---|---|---|
| SU | 1720475 | A3 | 3/1992 |

OTHER PUBLICATIONS

Translation of Ma (CN109437393A) (Year: 2019).*
Translation of Tao (CN202717631U) (Year: 2013).*
Translation of Kim (KR20000065590A) (Year: 2000).*
International Search Report and Written Opinion of the International Searching Authority in PCT Application PCT/US2022/033925 dated Oct. 13, 2022.
Google Patents Translation of Chinese Patent CN107434326A; dated Nov. 17, 2022; 5 pages.
Google Patents Translation of Chinese Patent CN207391102U; dated Nov. 17, 2022; 6 pages.
Google Patents Translation of Chinese Patent CN205313216U; dated Nov. 17, 2022; 4 pages.
Google Patents Translation of Chinese Patent CN207108725U; dated Nov. 17, 2022; 4 pages.
Google Patents Translation of Japanese Patent JPH11347313A; dated Nov. 17, 2022; 19 pages.
Google Patents Translation of Union of Soviet Socialist Republics Patent SU1720475A3; dated Nov. 17, 2022; 2 pages.
Google Patents Translation of Union of Soviet Socialist Republics Patent SU618122A1; dated Nov. 17, 2022; 3 pages.
https://www.apsed.in/soil-mechanics/soil-capillary-action; Capillarity of Soil; downloaded Nov. 9, 2023; pp. 1.
https://www.britannica.com/science/capillarity; Capillarity; published by Encylopaedia Britannica, Inc.; downloaded Nov. 9, 2023; pp. 1.
K. S. Lane and D. E. Washburn; Capillarity Tests by Capillarimeter and by Soil Filled Tubes; 1947; pp. 460-473.
https://www.ctahr.hawaii.edu/mauisoil/a_comp03.aspx; Soil Water; downloaded Nov. 9, 2023; pp. 1-3.
Dr. Robert Borden, P.E., "Emulsified Vegetable Oil (EVO) for Anaerobic Bioremediation", https://www.enviro.wiki/index.php?title=Emulsified_Vegetable_Oil_(EVO)_for_Anaerobic_Bioremediation&oldid=15980.

* cited by examiner

LAYERED CAPILLARY WETTING

TECHNICAL FIELD

This application regards systems, apparatus, articles of manufacture, and processes involving wastewater, stormwater, septic systems, and the like, and particularly designs for layered capillary wetting. More specifically, adjacent layers of varying capillarity properties serve to promote water retention via capillary action in a water infiltration system or components thereof.

BACKGROUND

Water having various sources including wastewater, storm water, and process water (all of which may herein be collectively referred to as ("water")) may be treated. Water treatment systems vary in size and scope. They can be sized for treatment of large amounts of water from a municipality or other large cumulative systems for benefitting many residences, businesses, and industrial facilities serviced by the municipality. The water treatment system can also be designed and sized for single home residential use and small scale residential and commercial uses.

A water treatment system will often include a septic or other more complex treatment tank ("tank") that can receive water, allow for solids from the water to settle out and remove Biological Oxygen Demand (BOD), Total Suspended Solids (TSS), nitrogen, phosphorus, bacteria and pathogens, among other constituents and emerging contaminants of concern. The water treatment system can also include an infiltration system, such as an infiltration field, for discharging the water back to the environment for further treatment and groundwater recharge. An infiltration field can be comprised of conduits, such as pipes, lying atop a bed of stone, or concrete and plastic galleries, and as well as a number of other technologies—both pre and post installation.

EXEMPLARY DESCRIPTIONS OF CERTAIN EMBODIMENTS

Figure 1:
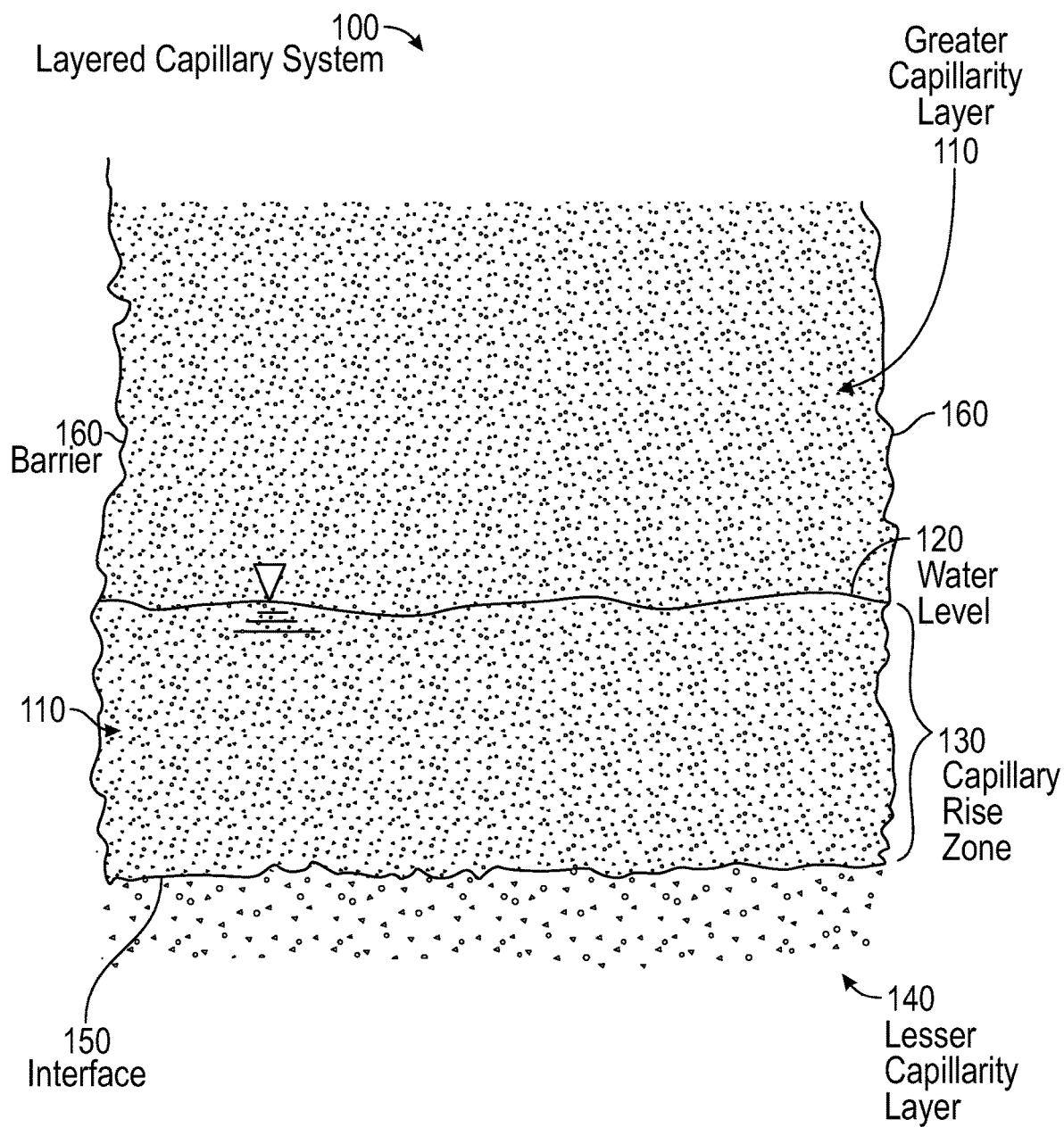
FIG. 1 shows a diagram of a greater capillarity layer above a lesser capillarity layer of a layered capillary system as may be employed in some embodiments.

Removal of nitrogen may be a concern in water treatment systems. A layer of soil, including sands, and wood matter or other carbon source may be utilized to remove nitrogen. However, the layer of soil and wood matter, in many cases, does not stay wet enough for prolonged periods of time to remain anaerobic and/or prevent the degradation of the carbon source, and ultimately, rendering the carbon source ineffective for denitrification. If a carbon source/soil layer is not anaerobic/anoxic, it will also not denitrify properly. Silt may be blended into soil to increase the water retention, and this method may work. Certain soils also work well. When soils that are finer grained than sand are utilized in a layer, they have greater capillarity, and therefore the capillary rise is greater, and these layers can therefore be taller and still remain saturated longer. Another approach that may be employed is to configure a sump or liner to create a saturated region coincident with the sand and wood blend. This is more complicated and expensive than simply placing a single layer of sand (or sandy material) and wood on top of native soil and beneath infiltration piping, a leaching system that is itself underlain with sand, for nitrification.

Embodiments may relate to processes, systems, articles of manufacture, and apparatus, directed to contaminant treatment in wastewater and/or stormwater systems and any associated infiltration systems. Processes, systems and apparatus may be directed to contaminant removal in wastewater (e.g., septic wastewater) and stormwater treatment systems, and any associated infiltration systems. Embodiments may utilize surface tension and associated capillary rise via differing permeability of adjacent layers of materials to provide cumulative wetted bed heights greater than heights available with a single homogenous layer of material. Also, one or more layers in a layered capillary system may contain one or more carbon sources such as wood, wood pieces, wood mulch, wood chips, sawdust, charcoal, food grade oil (new or used), and/or other organic material, and/or other carbon sources (each or a combination of which may be referred to as "carbon source material"). The layers of carbon source material may be positioned in material of greater relative capillarity (e.g., sandy material) that may be interspersed with layers of lower relative capillarity materials (e.g., materials of higher relative permeability). These adjacent layers of differing capillarity in layered capillary systems can serve to retain water via surface tension forces. The carbon source material may, thereby, remain saturated with water for a prolonged period, and the carbon source material may thereby be preserved, and its denitrification capabilities may be preserved. The saturated conditions also are more anoxic and anaerobic, promoting enhanced denitrification. Carbon source material may also be positioned between saturated or wetted layers of greater capillarity whereby a water seal above and below can retard $O_2$ flow to the carbon source material and prolong its useful life by promoting anoxic conditions between the two greater capillarity wetted layers. Accordingly, when a greater capillarity layer (e.g., a layer experiencing or promoting capillary rise within it) is above and below an unsaturated layer containing a carbon source, and especially when these layers are surrounded by an impermeable material, anaerobic and/or anoxic conditions result. This is because the flow of oxygen through a saturated interval is limited to the solubility of oxygen in air at that temperature and pressure. For instance, at sea level and 55 degrees Fahrenheit, the solubility of oxygen in water is 10 ppm. This effectively limits the transfer rate to 10 ppm and with the organic matter present the demand for oxygen exceeds the supply creating anaerobic and/or anoxic conditions.

Capillarity as used herein refers to a rise of a liquid, such as water, via the pores of a soil or other material, because of capillary action. Capillary action has been defined as an invisible force that works against the force of gravity. Capillary action works to push water or another liquid up a tube or narrow pipe, similar to soils pores. The increase in height of the liquid evidences capillary action. Surface tension of the water or other liquid promotes capillary rise by attraction of molecules between the water or other liquid and the soil or other material within which the water or other liquid rises. Greater capillarity and lesser capillarity as used herein provide for a relative distinction between the capillarity of a first material (e.g., a sandy material) and the capillarity of a second material (e.g., an aggregate material with greater sized pores). If the first material exhibits capillary rise height greater than the height of any capillary rise in the second material than the first material can be identified as having greater capillarity while the second material may be identified as having lesser capillarity. Thus, relative rise height of water or other fluid in the materials being compared can provide instruction as to which has greater capillarity and which has lesser capillarity. A higher capillary rise height has greater capillarity while a lower or no capillary rise height has lesser capillarity.

Embodiments may provide material layers exhibiting relative greater capillary action (which may be referred to as "greater capillarity layers" or "capillary action zones") and material layers exhibiting relatively lower capillary action (which may be referred to as "lesser capillarity layers") so as to maintain a target wetness in an infiltration system wetted area. This wetted area may contain a carbon source material whose lifespan is prolonged through prolonged continuous or frequently wet conditions where soil pores are largely full, rather than via cycles of saturation and drying of the carbon source material. The carbon source material may be mixed among sand, sandy material, or another material in the capillary action layers. The carbon source material may be periodically replenished. This replenishment may include using the original carbon source material and/or different carbon source material. Access conduits may be present within or adjacent to a lower capillarity layer to provide additional carbon source material. Carbon addition can be facilitated in one or more layers. In certain instances, the wood or other carbon source can be omitted in some, one, or all layers of embodiments. Conduit systems can be configured to supply carbon sources into layers of a layered capillary system. Fine wood or "sawdust" can be added by blowing it in with air or more preferably a non-oxygen containing gas, slurrying it into water, or otherwise transporting the carbon source materials to the wetted areas. Any nonenvironmentally harmful oil, including food grade oils, waste cooking oils, used cooking oil, and methanol, are exemplary carbon sources, as well as other carbon source materials, can also be added directly or otherwise transferred with a carrier to the desired areas as a carbon source material. Wood materials can also be treated with oils to allow greater carbon lifespan and preserve the wood from microbial degradation. In a preferred embodiment, carbon sources can be added through piping systems that are present, for example in a lower capillarity layer. As nitrified water passes down through the greater capillarity layer(s), it enters a lower capillarity layer where the carbon source has been added. It contacts the carbon source in an anaerobic environment resulting in denitrification and other treatment. Some of this water and carbon travel downwardly into the deeper stratum(s) for additional treatment. In embodiments, when oil is used as a carbon source, the viscosity of oil can be increased or decreased to get the oil to more or less readily pass downwardly through the sandy layers or be more viscous and better retained in the more permeable lesser capillarity layers. In certain instances, larger sized gravel or more transmissive material can be placed beneath a smaller sized gravel or relatively less transmissive. For instance, a ¾" stone material can be placed beneath a pea stone material to allow the more viscous oil or other carbon source to move laterally throughout this layer. In certain embodiments water is applied to the system to create a capillary rise. Then oil is applied to encourage the oil to move laterally across the water in the capillary rise interval, since the oil is lighter than water and it will not pass directly through it.

Embodiments may provide for nitrogen removal in or around a water infiltration field. Consistent with the above, in embodiments, layers of sandy material and carbon source material may be separated by more pervious layers, such that the sand/sandy material and carbon source material layers may stay wet enough to prevent or inhibit oxygen and the decomposition of the carbon source material and ultimately may prolong the ability of the carbon source material to be available for denitrification. Carbon source material may also be positioned between layers of greater capillarity. Anoxic conditions may be created between these layers such that degradation of the carbon source material can be diminished and/or retarded. A water seal created by layers of greater capillarity and sometimes a side barrier of water barrier material, can provide for these favorable anoxic conditions. In embodiments, while blended silt into sand may be employed to increase water retention, a sump or liner may, too, be employed to increase water retention, however, this is more complicated and expensive than simply placing layers of sand/sandy material and carbon source on top of native soil and beneath a leaching system underlain with sand/sandy material for nitrification. Capillary rise layers can also be utilized with finer grained soil mixtures, and will result in greater height in the capillary rise than with sands.

Embodiments, may take advantage of surface tension and associated capillary rise to provide for carbon source material wetting and promotion of prolonged and/or enhanced denitrification. For purposes of understanding and context, C-33 sand (sand) has a capillary rise of approximately 4 inches. If an approximately 4" greater capillarity layer of sand and carbon source material blend is placed on a lesser capillarity layer of pea stone, the capillary rise of water would keep the sand and carbon source material layer saturated and wet. Experimentation has shown that using 12-24" layers of the sand and carbon source material blend with a pea stone layer under it does create this capillary rise. However, in this example, only the bottom 4" of the sand and carbon source material is staying wet and preserving the organic matter to a high level. This limited wetted area, contained to the bottom 4 inches, has promoted thinking that since only a portion of the profile containing carbon material is wet or low in oxygen that it may not ultimately be a long-term option. This can also be offset by creating a more permeable region of lesser capillarity, such as pea stone overlaid by a less permeable region of greater capillarity, such as medium grained sand, above and below the layer containing the carbon source. This effectively limits oxygen transfer to that of the solubility of oxygen in water and as such can create low oxygen conditions without the entire profile being saturated or wet.

Despite this thinking and observations of performance of a single layer of sand, the inventor has conceived of and reduced to practice a new way to solve this problem. Greater capillarity layers of sand/sandy material (or other suitable soil) and a carbon source material blend may be interspersed with lesser capillarity layers of pea stone, GeoMat™, or other suitably permeable material.

In some embodiments the conversion of ammonium to nitrate to nitrogen gas may occur. Ultimately $NO_3$ comes in contact with a carbon source such as food grade oil, and promotes treatment, including denitrification. The microbes responsible for denitrification in these conditions utilize the carbon sources as an electron donor. In embodiments, various carbon sources may be employed. Some of which are noted herein. Carbon sources may be emulsified or slurried for transport via access conduits to greater capillarity layers of embodiments. Carbon sources such as oil may also be layered above a layer of soil and or sand, sometimes in a more permeable strata such as sand, and water may then pass through the layer of oil and percolate downwardly. The oil can also percolate downwardly and coat the sand or other soil as is percolates through. Oil or other carbon amendment viscosity can be chosen or adjusted to be better retained in the greater capillarity layer of the lesser capillarity layer.

Capillary action can provide for water levels in the capillary action layers in a medium of sand of four inches or more or less depending upon the relative permeability of the upper greater capillarity layer material and the lower adjacent lesser capillarity layer material. As head pressure in the standing water overcomes the water resistive forces at the interface of the lower lesser capillarity layer water can leave the higher capillarity layer and enter the lesser capillarity layer and be replenished by an equivalent amount in the upper greater capillarity layer as water infiltrates into it. Water barrier material and water barriers may comprise plastic, ceramic, or other water impervious or semi-impervious material and may be used at the perimeter of layers of a layered capillary system to prevent water passing around an upper layer/lower layer interface and to prevent oxygen from traveling into layers of a layered capillary system from outside the perimeter.

In embodiments, suitable materials for the lesser capillarity layers may include materials that exhibit less capillarity than the sand and carbon source material blend or other materials comprising the adjacent greater capillarity layer. For example, a layer of pea stone as a lesser capillarity layer over lain by an approximately 4" layer of sand and carbon source material blend as a greater capillarity layer, has been found to produce prolonged saturation of the layer of sand and carbon source material. Moreover, when a second layer of pea stone is over laid on the first layer of sand and carbon source material blend, a second layer of sand and carbon source material blend overlaid on the second layer of pea stone may also produce prolonged saturation of the second layer of sand and carbon source material blend. This process can be extended. For example, if 12" of sand and wood blend is required, three 4" layers of sand and carbon source material blend alternately separated by layers of approximately one inch high of pea stone may produce prolonged saturation of the all three layers of sand and carbon source material blend. Experimentation has shown that, in this configuration, a cumulative 12" of saturated sand and carbon source material blend results. Thus, some embodiments may employ a nitrogen removal system with two or more layers of blended sand and carbon source material separated by a material that exhibits less capillarity than the sand and carbon source material blend. Embodiments can have layers of greater capillarity that are thicker than the layers of the lesser capillarity material; especially when a conduit network is present to add a carbon source over time.

Accordingly, embodiments may include water treatment systems with infiltration systems that employ layered capillary wetting. The layers suitable for capillary wetting may include repeated groupings of layers of infiltration material having different capillary action properties. These infiltration materials may be layered upon each other in various thicknesses and in various arrangements or orders so as to increase the amount of retained water in the infiltration field. Patterned or unpatterned layers of material, such as alternating layers of various capillarity material, may be placed atop one another such that the height of retained water in the infiltration system capillary action zone is higher than if a single layer of infiltration material were used. Some layers of infiltration material may be selected so as to retard flow of water through the layer. This diminished flow of water through the layer may be attributable to surface tension of water preventing or retarding water flow through the infiltration material. Other layers of infiltration material may maintain a depth of water and/or may draw water up through the infiltration material such that the infiltration material maintains a capillary action zone that is likely wet. The capillary action zone may or may not contain carbon sources. These carbon sources may include wood, wood pieces, wood mulch, wood chips, sawdust, charcoal, other organic material, molasses, sugar, oil and/or other carbon sources, etc. Maintaining damp conditions for carbon source material(s) may serve to reduce degradation of the carbon source material(s), may preserve their denitrifying capability, and may extend their useful life in the infiltration system.

In embodiments, a first lesser capillarity layer of infiltration material may be below a first layer of greater capillarity material and a second lesser capillarity material layer of infiltration material may be above the first layer of greater capillarity material and a second layer of greater capillarity material may be above the second lesser capillarity layer. Accordingly, the upper layer and lower layer descriptions are relative descriptors addressing the relative position between two adjacent layers of material. An upper layer (upper strata) may be relatively less permeable than an adjoining lower layer (sub-strata) and an interface may be visible between the adjacent strata.

Still more layers may also be used in embodiments. For example: three, four, five, six, or more layers of lesser capillarity layers each associated with greater capillarity layers may be employed. In so doing, the majority or all of the greater capillarity layers may remain wetted for long periods of time and the total height of an infiltration system employing this layered capillary action approach is higher than if a single layer of greater capillarity material were placed atop a layer of stone.

In embodiments the greater capillarity materials (upper layer/upper strata) may comprise sands, some silt, loam and clay, and combinations thereof which may be generally referred to as a "sandy material".

In embodiments, suitable materials for the lesser capillarity layers (lower layer/sub-strata) may include materials that exhibit less capillarity than the sandy material and carbon source material blend. In embodiments the lesser capillarity layer materials may employ pea stone, crushed stone, GeoMat™, crushed stone, pea stone, crushed glass, crushed ceramic, ground rubber, tire chips, and round stone, cuspated materials, geotextile fabric, geotextile mats, polymer grids, polystyrene aggregate incorporated into suitable netting or blanket, filter fabric or filtering mat or crushed polymer materials. For example, the type of polystyrene aggregate associated with the commercial product EZflow Drainage Systems may be used. EZflow drainage systems are manufactured by RING Industrial Group, LP, 65 Industrial Park, Oakland, TN 38060. Other materials suitable for use in a lesser capillarity layer may include those capable of or suitable for developing a surface tension sufficient to maintain a column of water of as much as approximately four inches, or another target wetting height, in the greater capillarity layer materials above the lesser capillarity material layer. Each or a combination of these above materials suitable for use in a lesser capillarity material layer may be referred to as an "aggregate material".

In embodiments, a layer of lesser capillarity materials may be thinner than a layer of greater capillarity materials. For example, the lesser capillarity layer may be approximately one inch thick while the greater capillarity layer may be approximately four inches thick. Other layer thicknesses may also be employed. Embodiments may, for example, have lesser capillarity layers ranging from (½" to 6") in thickness while greater capillarity layers may have layers ranging in thickness from (3" to 24"). Lesser capillarity layers may also comprise voids bordered by filter fabric.

In embodiments, the total height of a layered capillary system may vary, depending on how many layers of lesser capillarity materials are utilized, how many layers of greater capillarity materials are utilized, and the thicknesses of these layers. For example, a layered capillary system may have a total height of between approximately 3.5 inches, to 12 inches, to 16 inches, to several or many feet, or any height in between.

In embodiments, layered capillary systems may have varying lateral dimensions, e.g., varying widths, lengths, or circumferences. These lateral dimensions may vary from inches to 10 or more feet, or even lengths of football fields or larger. For example, a layered capillary system, fed or wetted by a single dosing conduit, may have a width of 18 inches or more, and may have a length approximately as long as the length of the dosing conduit, which may be approximately 10 or more feet long, or other lengths, as well. As another example, a layered capillary system, fed or wetted by more than one dosing conduit, may have a width of 6 inches to 50 or more feet. A layered capillary system, can be dosed by one or more dosing conduits, may have a length approximately as long as the length of the longest dosing conduit, which may be approximately 5 or more feet long, or other lengths, as well. In embodiments, a layered capillary system may have varying lengths, such as where dosing pipes of varying lengths are used, thereby producing an irregular shape.

In embodiments, as noted above, carbon source material may comprise wood, wood pieces, wood mulch, wood chips, sawdust, charcoal, food grade oils, other organic material, and/or other carbon sources (each or a combination of which may be referred to as "carbon source material").

In embodiments, different carbon source materials and sandy materials may be combined in various combinations. More than one type of sandy material and/or carbon source material may be combined in a single greater capillarity layer. Further, a given greater capillarity layer may comprise different sandy materials and/or different carbon source materials from other greater capillarity layers; in other words, different greater capillarity layers may comprise different materials. Likewise, different materials may be combined in various combinations in lesser capillarity layers. More than one type material may be combined in a single lesser capillarity layer. Further, a given lesser capillarity layer may comprise different materials from other lesser capillarity layers; in other words, different lesser capillarity layers may comprise different or blends of materials.

Access ports may be positioned in one or more layers of embodiments. These access conduits may be employed to add carbon source materials. Surface level access may be provided whereby carbon source materials may be added or monitored from at or near surface level. These surface level access may include covered and uncovered access portals and may be connected to the access conduits through various structures and configurations. The connections and configurations may be individual connections as well as ganged connections with multiple access portals and access conduits being connected. The connections and configurations may be straight, curved, cornered, and other configurations whereby access to the access conduits may be provided via the connections from one or more access portal.

Embodiments may comprise various partially and fully assembled systems. These systems may comprise one or more of the following: a first layer comprising lesser capillarity material; a second layer comprising greater capillarity material, the second layer adjacent to and above the first layer; a third layer comprising lesser capillarity material; and a fourth layer comprising greater capillarity material, the fourth layer adjacent to and/or below the first layer, the fourth layer adjacent to and above the third layer. These systems may likewise comprise one or more of the following: a plurality of upright barriers, the upright barriers may be adjacent to one or more of the first layer, the second layer, the third layer, and the fourth layer, the upright barriers may comprise water and/or air/oxygen barrier material, and the first layer and the third layer may be approximately one inch thick, while the second layer and the fourth layer may be approximately four inches thick. Other thicknesses of the layers may also be employed in embodiments and the water and/or air/oxygen barrier material may be various materials including thicknesses suitable for inhibiting the flow of water through it. For example, plastic barriers may be a fraction of a millimeter thick or more while clay or bentonite may be somewhat thicker. The thicknesses of the layers may range from about one-half inch or less to about twelve inches or more. Plastic, concrete and metal structures can be utilized to construct systems in. These systems can be constructed on site or at a remote location and moved to the site to expedite construction.

In embodiments the greater capillarity material may comprise a blend of one or more sandy material and one or more carbon source material and/or the lesser capillarity material may exhibit less capillarity than the greater capillarity material. Furthermore, the lesser capillarity material may comprise one or more aggregate material. And, in some embodiments, a lesser capillarity material of a first layer and a third layer or other layer, may comprise a material capable of developing a surface tension sufficient to maintain a column of water of approximately four inches in the applicable above-adjacent layer (e.g., second of fourth, etc.). Embodiments may sometimes comprise a carbon source material that may be present in either or both the lesser capillarity material and the greater capillarity material.

Embodiments may comprise various partially and fully assembled systems. These systems may comprise one or more of the following: a first layer of a sandy material; a second layer of a lesser capillarity material, the second layer below the first layer, the second layer adjacent to the first layer and comprising a means to introduce a carbon source into the second layer; and a third layer of a sandy material, the third layer below the second layer, the third layer adjacent to the second layer, wherein the lesser capillarity material may be more permeable to water than the sandy material of the first layer. Embodiments may comprise a fourth layer of a lesser capillarity material, the fourth layer below a third layer; and a plurality of upright barriers, the upright barriers adjacent to a first layer, a second layer, the third layer, and the fourth layer, the upright barriers comprising water and/or oxygen barrier material. Embodiments may also comprise a first conduit positioned in the first layer and a second conduit positioned in the second layer, the first conduit having an access port apart from the first layer, the second conduit having an access port apart from the second layer. In some embodiments, a lesser capillarity material may comprise an aggregate material and/or one or more of the following: pea stone, crushed stone, crushed glass, crushed ceramic, ground rubber, tire chips, round stone, cuspated materials, geotextile fabric, geotextile mats, polymer grids, polystyrene aggregate incorporated into suitable netting or blanket, filter fabric, filtering mat, or crushed polymer materials.

In some embodiments, a carbon source material may be present in at least a first conduit or a second conduit; and a means to introduce a carbon source material may comprise one or more of the following: a pipe, an injection port, a conduit, a pipe with surface level access, an injection port with surface level access, or a conduit with surface level access. A plurality of accessible injection points fluidly connected to a first conduit or a second conduit or both may also be present in embodiments; and access ports sized to receive carbon source material and to pass the received carbon source material to at least one of a first layer, a second layer, or a third layer may be present. Access ports may be resident at grade when installed or may reside below grade when installed as well. A dosing conduit positioned in fluid communication with a first layer may be present in some embodiments and a third layer may be positioned at least above or adjacent to granular material. In some embodiments, water from a third layer or lowest layer may be discharged towards an underground water table or underlying soil. Alternatively, an impermeable liner or the like can be installed beneath the system to allow reuse of the treated water as opposed to recharging it back into the environment.

Embodiments may comprise various methods with various intermittent process steps. The following intermittent process steps may be performed in various orders and with or without additional or fewer process steps in embodiments. Embodiments may comprise one or more of the following: passing water to a first layer of a sandy material; after passing the water to the first layer, passing the water to a second layer of a lesser capillarity material, the second layer below the first layer, the second layer adjacent to the first layer and the second layer comprising an access conduit sized and positioned to introduce a carbon source into the second layer; after passing the water to the second layer, passing the water to a third layer of a sandy material, the third layer below the second layer, the third layer adjacent to the second layer, wherein the lesser capillarity material is more permeable to water than the sandy material of the first layer; and receiving water from the third layer and polishing the received water before returning the water to the environment. Embodiments may also comprise one or more of the following: polishing received water to include decreasing a contaminant level in the water, the contaminant remaining in the water from an upstream source; placing a carbon source material into an access conduit; an access conduit comprising one or more of the following: a pipe, an injection port, a pipe with surface level access, or an injection port with surface level access; and polishing the received water to comprise passing the water through a treatment media.

Treatment media may preferably be sand, or soil, perlite, biochar, peat, diatomaceous earth, or blends of these materials or other material having a porosity less than the porosity of any distribution media in an infiltration field. The treatment media may comprise or consist of a carbon source as well as an iron containing substance or a substance for adjusting alkalinity or ph. Iron shavings or another iron source may be used to bind phosphorus. Stone being employed may be limestone, which can provide ph adjustment.

Carbon sources, which may be added to treatment media, or may be used as its own treatment media, may include food grade oils, sawdust, sugar, wood chips, molasses, and other carbon sources. When wood materials are blended into sand during construction, the carbon in the wood can be consumed over time. Carbon sources can be added to rejuvenate the treatment efficiency. Still further, access conduits may be used for connection to other treatment systems including denitrification systems and additional leaching components.

Compared to distribution media, treatment media, when placed, is preferably conducive to treatment of water received from a dosing pipe or distribution media or other conveyor of water. Treatment may occur within the treatment media itself as well as at infiltrative interfaces between the treatment media or distribution media and another material, such as surrounding soil or distribution media. Infiltration interfaces of infiltration surfaces and/or nested infiltration surfaces may or may not employ geotextile fabric, such as filter fabric, or other geotextile material. Accordingly, treatment media, when placed, is preferably conducive to treatment of water received from a dosing conduit or distribution media or other water source. Leaching interfaces may or may not employ filter fabric or other geotextile material. The treatment media may comprise sand or soil or diatomaceous earth, or a carbon source material, or other media capable of treating water. Some embodiments may employ non-sandy soil as a treatment media, while other leaching infiltration fields may employ sand as a treatment media. In embodiments, an exemplary multiple band infiltration field may employ sand as one treatment media, non-sandy soil as a second treatment media, stringy plastic mat as a first distribution media, and stone aggregate as a second distribution media. Other combinations of materials, for systems or methods employing layered capillary wetting, may also be used in embodiments.

FIG. 1 shows a diagram of upper and lower layers of a layered capillary system as may be employed in embodiments. Numbered in FIG. 1 are a layered capillary system 100, greater capillarity layers 110, water level 120, capillary rise 130, lesser capillarity layer 140, interface 150, and barrier 160. The capillary rise shown in FIG. 1 may be employed in various infiltration fields as well as components of infiltration fields. As can be seen, the greater capillarity layer 110 sits atop the lesser capillarity layer 140 and each layer is bordered by a barrier 160. The barrier 160 is shown in an upright position but may have various orientations in embodiments. The barrier is preferably water and/or air and/or oxygen impervious or somewhat water and/or air and/or oxygen impervious. The combination and positioning of the greater capillarity layer 110 and the lesser capillarity layer 140 and the barrier 160 provide that water introduced into greater capillarity layer can rise and remain in a standing layer above the interface 150. This capillary rise 130 area provides for a wetted area up to water level 120 that can permit for continuous or near continuous wetted conditions therein. These wetted conditions can provide longevity for treatment materials, such as carbon source material, present in the capillary rise 130 as well as create the conditions low or absent of free oxygen. In other words, the relative difference in porosity between the greater capillarity layer 110 and the lesser capillarity layer can promote a perched water table or standing water level in the greater capillarity layer 110 and this standing water level can be used to maintain wetted or nearly wetted conditions for materials placed in the capillary rise 130 zone. By staying wet for longer durations of time, even between dosing periods, materials in this capillary rise 130 zone may enjoy longer useful service lifecycles than if the materials were repeatedly and quickly wetted and dried during ongoing periodic dosing cycles of an infiltration field. Materials placed below these layers may also enjoy longer useful life provided that anoxic conditions are maintained or promoted below or between a wetted layer or wetted layers.

The greater capillarity layer 110 may also be labelled a capillary action zone, an upper-strata, an upper layer and/or a material that has greater capillary action than the material comprising the lesser capillarity layer 140. The lesser capillarity layer 140 may also be labelled a sub-strata or a lower layer. The lesser capillarity layer 140 may contain material that is more permeable or has less capillary action than the material comprising the greater capillarity layer. In some embodiments, a lesser capillarity layer 140 may comprise a void with a filter fabric boundary. The interface 150 shows where the layers 110 and 140 are adjacent to each other. A geotextile material may or may not be present at this interface 140.

Figure 2:
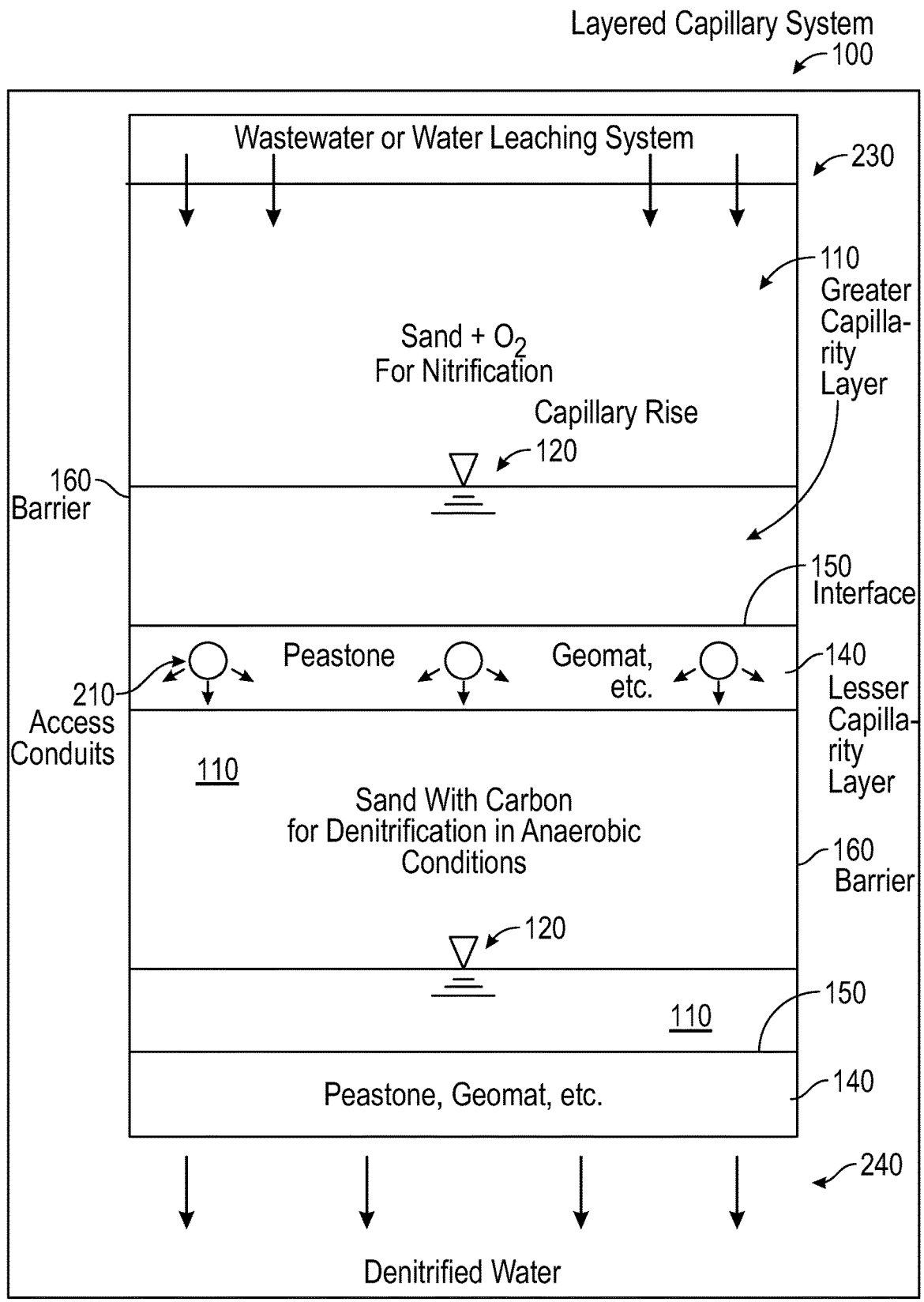
FIG. 2 shows a diagram of multiple capillarity layers of a layered capillary system as may be employed in some embodiments.

FIG. 2 shows a diagram of multiple layers of a layered capillary system as may be employed in embodiments. Numbered in FIG. 2 are layered capillary system 100, greater capillarity layer 110, interface 150, lesser capillarity layer 140, barrier 160, and access conduits 210. The greater capillarity layers 110 may comprise various materials as taught herein. FIG. 2 shows that sand or sand with a carbon source may be employed in greater capillarity layers 110. Sand plus the presence of $O_2$ may reside in a greater capillarity layer and can serve to promote nitrification. Sand plus carbon may serve to promote denitrification in anaerobic conditions. FIG. 2 also shows how water infiltration system 230 can dose water into the layered capillary system 100 and that denitrified water 240 can exit the layered capillary system 100. Access conduits 210 are shown in the lesser capillarity layers 140, which may be peastone, Geomat, or other materials as taught herein. Carbon source material may be added to the layered capillary system 100 via the access conduits 210. The barrier 160 may be a plastic liner or other material that can serve to hold water and/or air/oxygen in the capillary action system 100 and allow the water and/or air/oxygen to move from a greater capillarity layer 110 to a lesser capillarity layer 140. Because of the varied porosity between these two layers, capillary rise 120 can occur and the associated water from the capillary rise can serve to keep material in the capillary rise zone wet.

Figure 3:
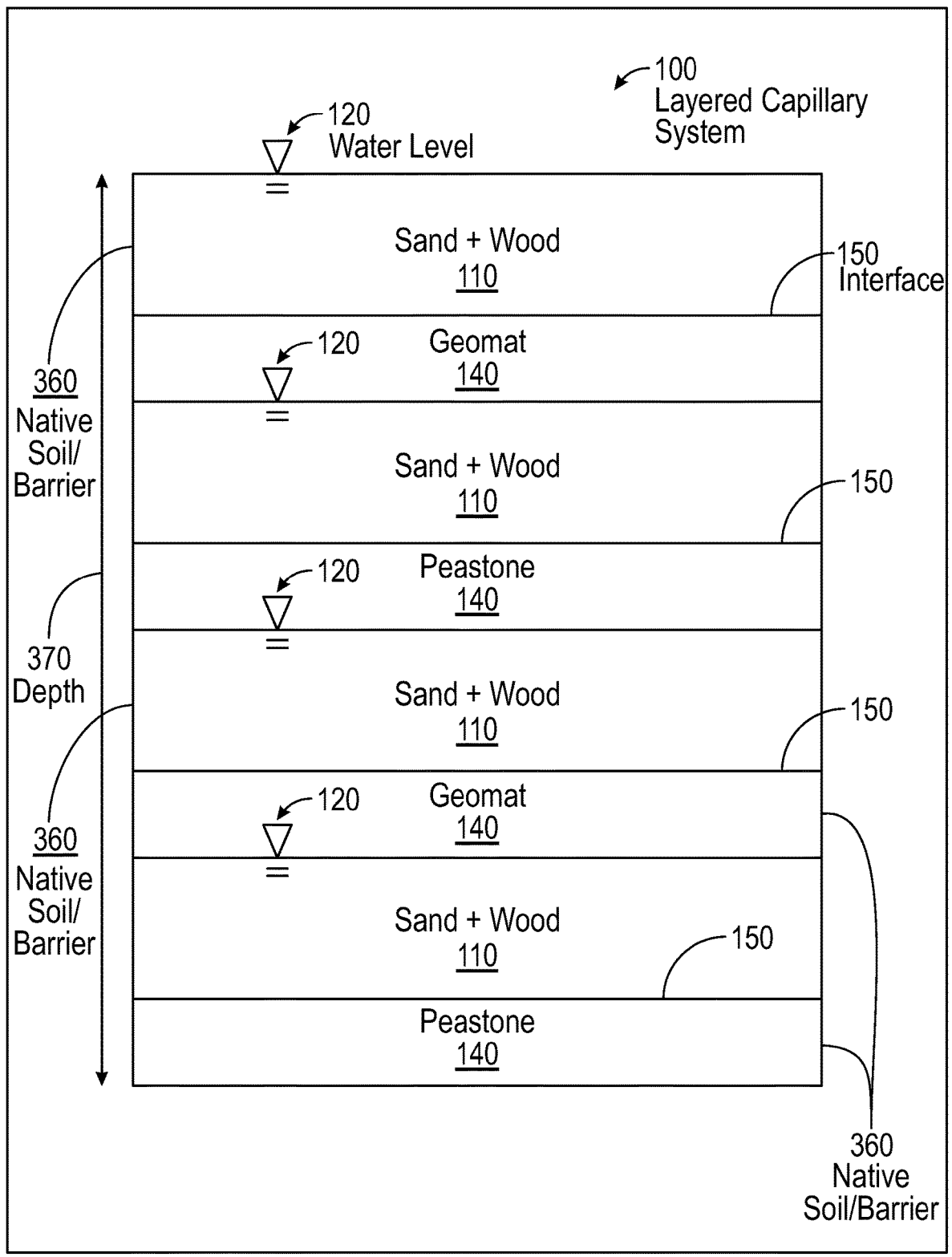
FIG. 3 shows a diagram of multiple capillarity layers of a layered capillary system as may be employed in some embodiments.

FIG. 3 shows a diagram of multiple layers of a layered capillary system as may be employed in embodiments. Numbered in FIG. 3 are a layered capillary system 100, greater capillarity layers 110, lesser capillarity layers 140, native soil/barrier 360, interface 150, water level 120, and depth 370 of the layered capillary system 100. As can be seen, the depth 370 is shown to be sixteen inches and the capillary rise, signified by the water level 120, within each greater capillarity layer 110, is shown to occupy the vast majority of the greater capillarity layer 110. As the vast majority of the greater capillarity layer 110 is occupied in the capillary rise, the greater capillarity layer 110 can remain wet for long durations of time. Sand and wood or other carbon source comprising the greater capillarity layer 110 may remain wet for long durations of time and thereby remain a viable promoter of denitrification of the water passing through the layered capillary system. The outer sides of the layered capillary system 100 comprise native soil/ barrier 360. This barrier, which may be native soil if it is sufficiently impermeable to prevent water and/or air from passing through or another material such as a plastic liner that can serve to hold back water and/or air, can serve to guide the water transport within the layered capillary system 100 from one layer to the next and not, accordingly, to circumvent a layer prior to reaching an intended lowest layer of layered capillary system for recharge back to the environment, recycling to the layered capillary system, further polishing of the effluent water, etc. This surrounding material must also inhibit air and oxygen transfer to result in anaerobic/anoxic conditions in the underlying layers.

Figure 4:
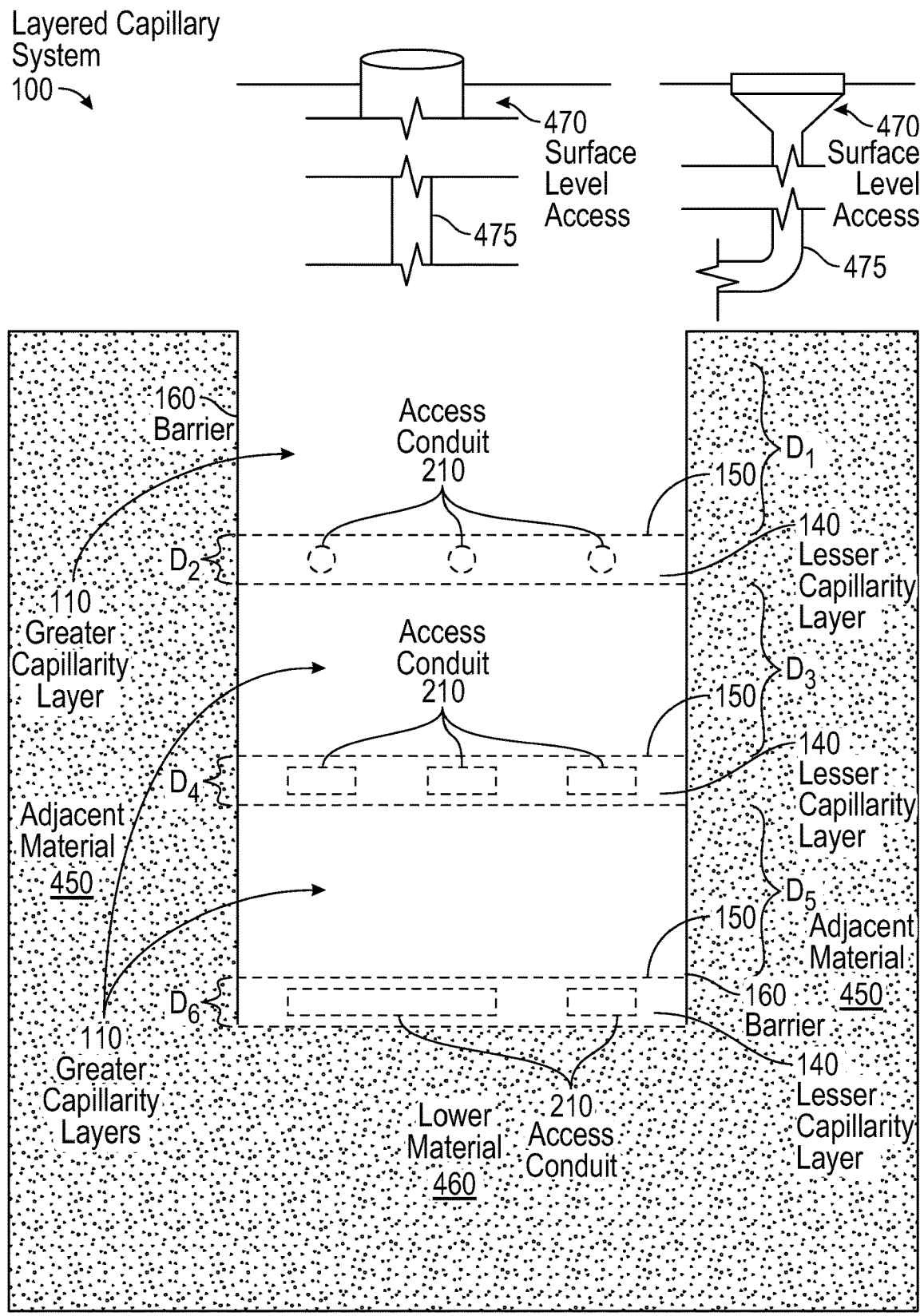
FIG. 4 shows a diagram of multiple capillarity layers of a layered capillary system as may be employed in some embodiments.

FIG. 4 shows a diagram of multiple layers of a layered capillary system as may be employed in embodiments. Numbered in FIG. 4 are surface level access 470, conduit 475, layered capillary system 100, access conduit 210, interface 150, lesser capillarity layers 140, greater capillarity layers 110, barrier 160, adjacent material 450, lower material 460 and thicknesses $D_1$-$D_6$. The thicknesses $D_1$-$D_6$ show that the lesser capillarity layers 140 may be thinner than the greater capillarity layers 110. The lesser capillarity layers in embodiments may have similar or identical thicknesses as well as different thicknesses. Likewise, in embodiments, the greater capillarity layers may have similar or identical thicknesses as well as different thicknesses. The lower material 460 may comprise one or more treatment media that can serve to further polish (e.g., process or treat) water that has passed though the layered capillary system 100. The lower material may comprise treatment media or existing fill material or another material as well as combinations thereof. The adjacent material 450 may comprise treatment media or existing fill material or another material as well as combinations thereof.

As can be seen in FIG. 4 the access conduits may have various configurations and spacings and may be located in the surface tension layers 140. The access conduits may be connected to surface level access 470 via conduits 475. Surface level access may be located at the surface of an installation as well as below the surface of an installation but somehow accessible from the surface of an installation. Surface level access may be used to monitor the status of materials in a layered capillary system. The barrier 160, which can comprise various materials that can serve to retard or prevent fluid flow, or air flow or oxygen flow, can serve to guide water from one layer to the next.

Figure 5:
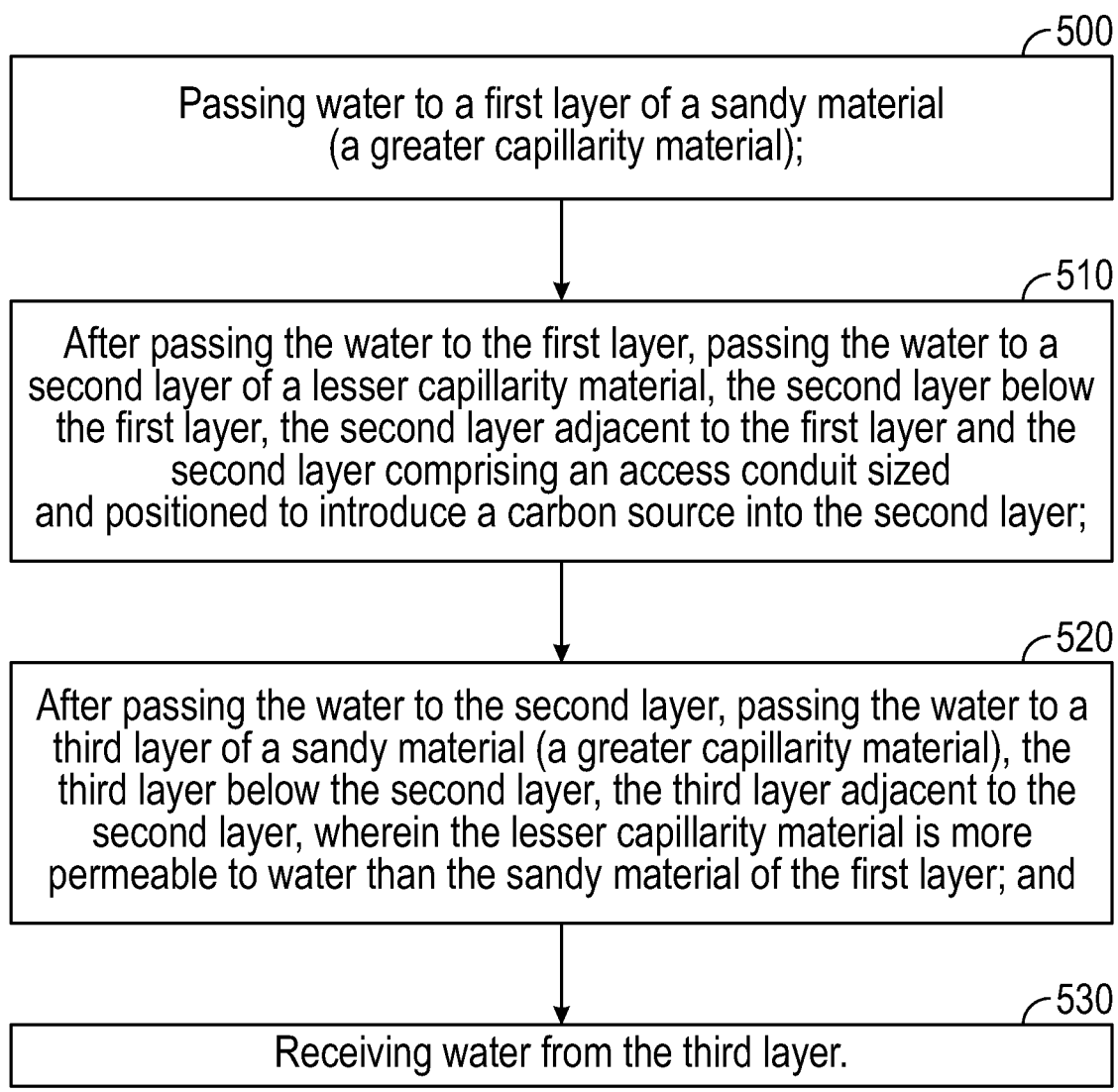
FIG. 5 shows method steps that may individually or cumulatively be employed in some embodiments.

FIG. 5 shows method steps that may individually or cumulatively be employed in embodiments. The method of FIG. 5 includes steps that may be performed in various orders and with or without additional steps and/or features. the method of Figure can include steps such as the following: 500—passing water to a first layer of a sandy material; 510—after passing the water to the first layer, passing the water to a second layer of a lesser capillarity material, the second layer below the first layer, the second layer adjacent to the first layer and the second layer comprising an access conduit sized and positioned to introduce a carbon source into the second layer; 520—after passing the water to the second layer, passing the water to a third layer of a sandy material, the third layer below the second layer, the third layer adjacent to the second layer, wherein the lesser capillarity material is more permeable to water than the sandy material of the first layer; and 530—receiving water from the third layer and polishing the received water before returning the water to the environment. As noted above, embodiments may also comprise one or more of the following: polishing received water to include decreasing a contaminant level in the water, the contaminant remaining in the water from an upstream source; placing a carbon source material into an access conduit; an access conduit comprising one or more of the following: a pipe, an injection port, a pipe with surface level access, or a temporary or permanent injection port with surface level access; and polishing the received water to comprise passing the water through a treatment media.

Embodiments, may regard systems, apparatus, articles of manufacture, and processes involving wastewater treatment. More particularly, wastewater infiltration systems for use in residential, commercial, or industrial wastewater treatment systems are provided herein. There are various adaptations of embodiments, and many permutations may be employed within the spirit and scope of this disclosure. Those of skill will understand that the invention is not to be limited to only those embodiments described herein and that other embodiments and applications consistent with the teachings herein would also fall with the scope of this disclosure.

The preceding detailed description is merely illustrative in nature and is not intended to limit the embodiments of the subject matter of the application or uses of such embodiments. Numerous embodiments are possible beyond those specifically described above and below. The embodiments described here are illustrative and should not be considered to be limiting. This includes that the processes described herein may be undertaken in various orders unless a specific order is called for in the applicable claim or description. Moreover, fewer or more features or actions may accompany those specifically described herein. Likewise, disclosed embodiments, whether in the brief summary or detailed description may be further modified, including being altered using features and processes selected from different embodiments and using features and processes in different orders and configurations.

The preceding detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Any appearance of the phrases "in one embodiment" or "in an embodiment" do not necessarily refer to the same embodiment. Particular features, structures, or characteristics may be combined in any suitable manner consistent with this disclosure.

While embodiments have been illustrated herein, they are not intended to restrict or limit the scope of the appended claims to such detail. In view of the teachings in this application, additional advantages and modifications will be readily apparent to and appreciated by those having ordinary skill in the art. Accordingly, changes may be made to the above embodiments without departing from the scope of the invention.

It will be further understood that the terms "comprises" and/or "comprising," when used in this specification, are open ended terms and specify the presence of stated features, integers, steps, operations, elements, and/or components, but do not preclude the presence or addition of one or more other features, integers, steps, operations, elements, components, and/or groups thereof.

"Configured to" connotes structure by indicating a device, such as a unit or component, includes structure that performs a task or tasks during operation, and such structure is configured to perform the task even when the device is not currently operational (e.g., is not on/active). A device "configured to" perform one or more tasks is expressly intended to not invoke 35 U.S.C. § 112, (f) or sixth paragraph.

As used herein, the terms "about" or "approximately" in reference to a recited numeric value, including for example, whole numbers, fractions, and/or percentages, generally indicates that the recited numeric value encompasses a range of numerical values (e.g., +/−5% to 10% of the recited value) that one of ordinary skill in the art would consider equivalent to the recited value (e.g., performing substantially the same function, acting in substantially the same way, and/or having substantially the same result). As used herein, the terms "about" or "approximately" in reference to a recited non-numeric parameter generally indicates that the recited non-numeric parameter encompasses a range of parameters that one of ordinary skill in the art would consider equivalent to the recited parameter (e.g., performing substantially the same function, acting in substantially the same way, and/or having substantially the same result).

Recitation of ranges of values herein are merely intended to serve as a shorthand method of referring individually to each separate value falling within the range, unless otherwise indicated herein, and each separate value is incorporated into the specification as if it were individually recited herein.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

"Improve" or "Promote"—As used herein, improve or promote is used to describe an increasing or maximizing effect. When a component, element, or feature is described as improving or promoting an action, motion, or condition it may produce the desired result or outcome or future state completely. However, when a component, element, or feature is referred to as improving or promoting a result or outcome or state, it need not completely produce the desired result or outcome or state; rather only an increase is required, as compared to the result or outcome or state in the absence of the component, element, or feature. Additionally, "improve" or "promote" can also refer to an increase of the outcome, performance, and/or effect which might otherwise occur, even in the absence of the component or feature.

"Prolong"—As used herein, prolong is used to describe an effect of increase or lengthening of time. When a component, element, or feature is described as prolonging an action, motion, or condition it may produce the desired time increase or lengthening effect as compared to the time the action, motion, or condition would last or endure without the presence of the component, element, or feature.

"Capable of"—As used herein, a material is "capable of" performing an act or achieving an effect when the material performs or achieves as specified at least under certain conditions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

It should be noted that the terms "first", "second", and "third", and the like may be used herein to modify elements performing similar and/or analogous functions. These modifiers do not imply a spatial, sequential, or hierarchical order to the modified elements unless specifically stated.

The corresponding structures, material, acts, and equivalents of any means or steps plus function elements in the claims are intended to include any structure, material or act for performing the function in combination with other claimed elements. The description of certain embodiments of the present invention have been presented for purposes of illustration and description, but is not intended to be exhaustive or limited to the invention in the form disclosed. Many modifications and variations will be apparent to those of ordinary skill without departing from the scope and spirit of the invention. These embodiments were chosen and described in order to best explain the principles of the invention and the practical application, and to enable others of ordinary skill in the art to understand the invention for embodiments with various modifications as are suited to the particular use contemplated.

The scope of the present disclosure includes any feature or combination of features disclosed herein (either explicitly or implicitly), or any generalization thereof, regardless of whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The description of the embodiments has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. A water infiltration system comprising: a wastewater dosing conduit; a first group of layers and a second group of layers, the first group of layers having a first layer and a second layer, the second group of layers having a third layer and a fourth layer, the first group of layers positioned below the wastewater dosing conduit, a means to introduce a carbon source material positioned in or below the second layer, the first layer adjacent to and above the second layer, the third layer adjacent to and below the second layer, wherein the first layer comprising a first material and the second layer comprising a second material the first material having a capillary action material property and the second material having a capillary action material property, wherein the capillary action material property of the first material is greater than the capillary action material property of the second material; and the third layer comprising a third material and the fourth layer comprising a fourth material, the third material having a capillary action material property and the fourth material having a capillary action material property, wherein the capillary action material property of the third material is greater than the capillary action material property of the fourth material, wherein a carbon source material is present in at least the first layer or the second layer or the third layer or the fourth layer, and wherein the carbon source material comprises oil; and wherein the water infiltration system is configured to promote nitrification and denitrification.

2. The system of claim 1 further comprising: a plurality of upright barriers, at least one of the upright barriers of the plurality of upright barriers adjacent to the first layer, adjacent to the second layer, adjacent to the third layer, and adjacent the fourth layer, the upright barriers of the plurality of upright barriers comprising barrier material.

3. The system of claim 1 wherein the second layer and the fourth layer are in the range of 0.5-2 inches thick, and the first layer and the third layer are in the range of 6-24 inches thick.

4. The system of claim 1, wherein the first layer and the third layer each comprises one or more sandy material and one or more carbon source material.

5. The system of claim 1 further comprising an access port connected to the means to introduce a carbon source material.

6. The system of claim 1, wherein the second layer or the fourth layer or both comprises one or more of the same aggregate material or a material with multiple void spaces.

7. The system of claim 1, wherein at least the first material of the first layer is configured to permit a surface tension sufficient to maintain a column of water of approximately 0.5-12 inches.

8. The system of claim 1 wherein the carbon source material is present in the second, third, and fourth layers and the carbon source material is not present in the first layer and wherein the carbon source material further comprises wood; and wherein the oil of the carbon source material is one or more of: food grade oil, waste cooking oil, or used cooking oil.

9. A water infiltration system comprising: a wastewater dosing conduit; a first layer of a first material, the first material being a first sandy material having a capillary action material property, the first layer of the first material positioned below the wastewater dosing conduit; a second layer of a second material having a capillary action material property, wherein the capillary action material property of the second material is less than the capillary action material property of the first material such that the capillary rise height of water in the second material is less than the capillary rise height of water in the first material, the second layer below the first layer, the second layer adjacent to the first layer, and comprising a means to introduce a carbon source into the second layer; and a third layer of a third material having a capillary action material property, the third material being a second sandy material, the third layer below the second layer, the third layer adjacent to the second layer; wherein the second material has a water permeability greater than the water permeability in the first material and wherein a first carbon source is present in the second layer, the first carbon source comprising oil; and wherein the water infiltration system is configured to promote nitrification and denitrification.

10. The system of claim 9 further comprising: a fourth layer of a fourth material having a capillary action material property, the capillary rise height of water in the fourth material being less than the capillary rise height of water in the first material, the fourth layer below the third layer and a plurality of upright barriers, the upright barriers adjacent to the first layer, the second layer, and the third layer, the upright barriers comprising barrier material.

11. The system of claim 9 wherein the means to introduce a carbon source is a first conduit positioned in the second layer, the first conduit having an access port apart from the second layer.

12. The system of claim 10 wherein the second material and the fourth material are the same and comprise an aggregate material.

13. The system of claim 9 wherein the second material comprises one or more of the following: pea stone, crushed stone, crushed glass, crushed ceramic, ground rubber, tire chips, round stone, cuspated materials, geotextile fabric, geotextile mats, polymer grids, polystyrene aggregate incorporated into a layer, netting, blanket, filter fabric, filtering mat, or crushed polymer materials.

14. The system of claim 9 wherein a second carbon source material is present in at least the means to introduce a carbon source, the second carbon source material comprising food grade oil.

15. The system of claim 11 further comprising a plurality of accessible injection points fluidly connected to the first conduit, the injection points sized to receive the second carbon source material and to pass the received second carbon source material to at least one of the second layer or the third layer.

16. The system of claim 9 wherein the third layer is positioned at least above or adjacent to granular material.

17. The system of claim 5 wherein the access port is a surface accessible access port.

18. The system of claim 1 wherein the second material and the fourth material comprise the same material.

19. The system of claim 5 wherein the access port is an injection port.

* * * * *